United States Patent [19]
Foster

[11] Patent Number: 5,711,377
[45] Date of Patent: Jan. 27, 1998

[54] ELEVATED HORSESHOE

[75] Inventor: Burke Lee Foster, 11520 Calvert Rd., Mobile, Ala. 36608

[73] Assignee: Burke Lee Foster, Mobile, Ala.

[21] Appl. No.: 534,871

[22] Filed: Sep. 27, 1995

[51] Int. Cl.$^6$ ............................................. A01L 7/02
[52] U.S. Cl. ...................................... 168/14; 168/28
[58] Field of Search ........................... 168/14, 26, 28

[56] References Cited

U.S. PATENT DOCUMENTS

| | | | |
|---|---|---|---|
| 594,080 | 11/1897 | Hennessy | 168/28 |
| 5,174,382 | 12/1992 | Wright | 168/28 |
| 5,253,715 | 10/1993 | Ovnicek | 168/14 |

FOREIGN PATENT DOCUMENTS

| | | | |
|---|---|---|---|
| 187294 | 10/1922 | United Kingdom | 168/28 |
| 9424855 | 11/1994 | WIPO | 168/26 |

*Primary Examiner*—Robert P. Swiatek

[57] ABSTRACT

A one piece elevated horseshoe to be used on the front feet of a gaited performance horse. The toe to heel angle is adjustable from 0 to 20 degrees, constructed and formed from materials in such a manner as to have adjustable rebound and shock absorbing characteristics. The elevated horseshoe is attached indirectly to the horse's front feet using a conventional nailer pad between the horse's hoof and the elevated horseshoe.

2 Claims, 6 Drawing Sheets

SECTION 2-2

SECTION 2-2

SECTION 1-1

ELEVATED HORSESHOE

FIELD OF THE INVENTION

The invention relates generally to the field of farriery and more particularly to the front shoes, commonly referred to as "built-up" shoes, of the Tennessee Walking and Racking horse and other gaited horses for show and performance purposes.

The built-up shoes are not attached directly to the horse's hoof but attached to a plate (nailer pad) which is attached to the horses hoof.

BACKGROUND OF THE INVENTION

The current art of built-up front shoes is readily recognized by farriers and Walking Horse enthusiasts.

The current art for the built-up shoe is for the farrier to first shape and nail a ½" thick nailer plate or pad, usually of a plastic material, to the front hoofs of the horse. A layer of silicone or other resilient material is packed between the frog area of the horse's sole and the nailer plate, the purpose being to cushion and stimulate the frog to act much as if the hoof was striking the ground and maintaining the pumping action of frog of the horse's foot. Then an elevated shoe is fashioned or built-up from flat and alternating wedge shaped strips to form a shoe with a shape similar to the nailer pad on the horse's hoof but being elevated and the heel being higher than the toe. The built-up shoe is then placed against the nailer pad and the nailer pad is nailed to the elevated built-up shoe.

The ideal method for starting a green colt is to start him on a flat pad and progressively increase the heel height and the toe to heel angle until the desired result is achieved. Due to the cost of multiple fittings this practice is usually compromised and very often green colts are started on a built-up shoe sized according to what is perceived to be needed as an end result. This can cause undesirable results including injury to the colt.

During training and use of the mature horse it is often desirable to experiment or change the toe to heel angle or lateral angle to improve the horse's performance. With the current art this can be costly and a time consuming effort and is usually compromised.

The built-up shoes are typically made of plastic and offer some resilience to shock loads, but in use are soon compacted and offer little to reduce shock loads or offer rebound characteristics.

The pieced together built-up shoes can be unsightly and it is not rare for the shoes to come apart during use causing potential safety problems.

SUMMARY OF THE INVENTION

The invention involves an elevated horse shoe or hoof extension preformed or molded into one piece around the required internal components. The elevated shoe would be shaped and installed similar to the current art built-up shoe.

The elevated shoe will be different, new and unique in that it would be one piece molded from a resilient flexible material such as but not limited to urethane. The outer thickness of the elevated shoe would cover or envelop the internal components leaving at least one void that could be pressure compensated as desired. The side walls and heel walls would have a greater degree of extensibility when compared to other portions of the shoe allowing the pressure chamber to raise the heel height. The heel portion of the elevated shoe would be fitted with provisions to limit or adjust the maximum heel height independent on two corners.

The elevated shoe once installed on a horse may be adjusted to raise or lower the heel height. The void within the shoe could be pressure compensated to suit the heel height and the shock or rebound characteristics desired.

An elevated shoe of a solid or honeycomb design is an option to be used where the desired height and angle are known and a one piece shoe is desired.

The elevated shoe can be offered in sizes much the same as conventional keg shoes are offered.

The shape of the elevated shoe can be such as to allow what could be considered the bottom surface, by choice, to be inverted and used as the top surface. The shape of the elevated shoe could allow one flat surface to be longer than the other flat surface and have other features allowing the user to position the shoe for the desired effects.

A non-adjustable shoe with or without at least one chamber is also included for the purpose of allowing the user, once the shape and characteristics are known, to eliminate the variables.

DETAILED DESCRIPTION OF THE INVENTION

Figure 1:
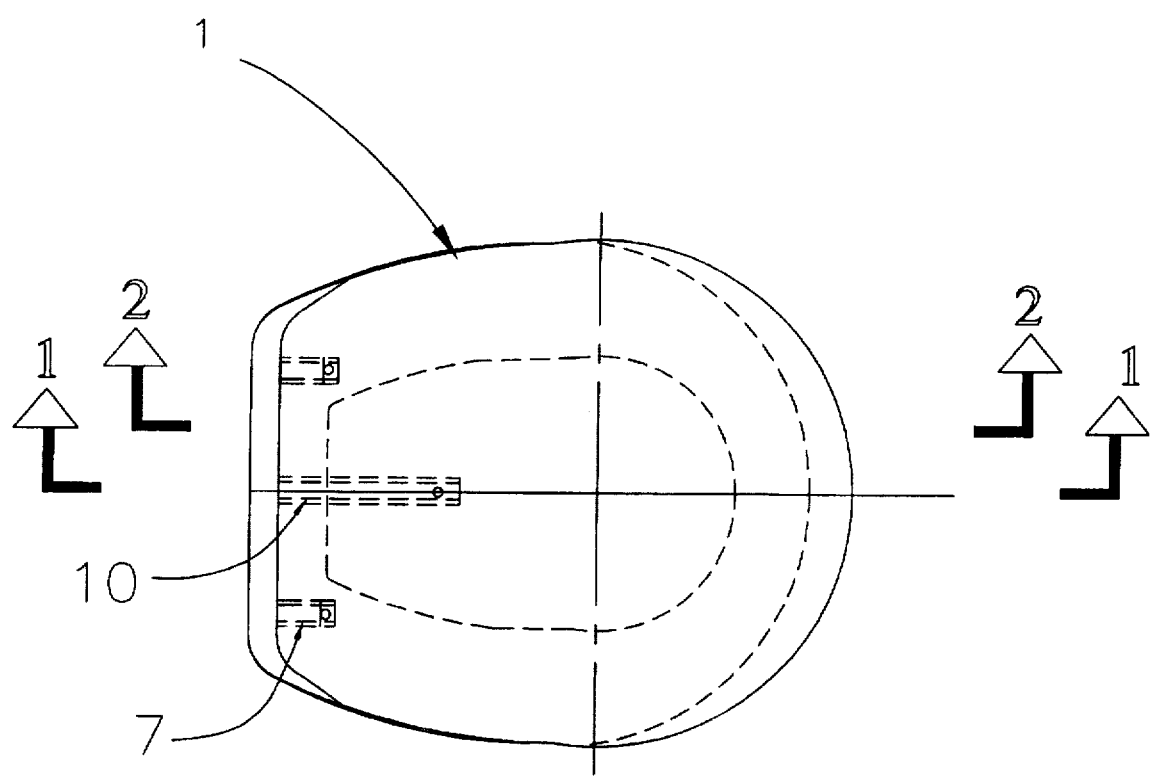
FIG. 1 is a top plan view showing the general shape of the shoe.
Figure 2:
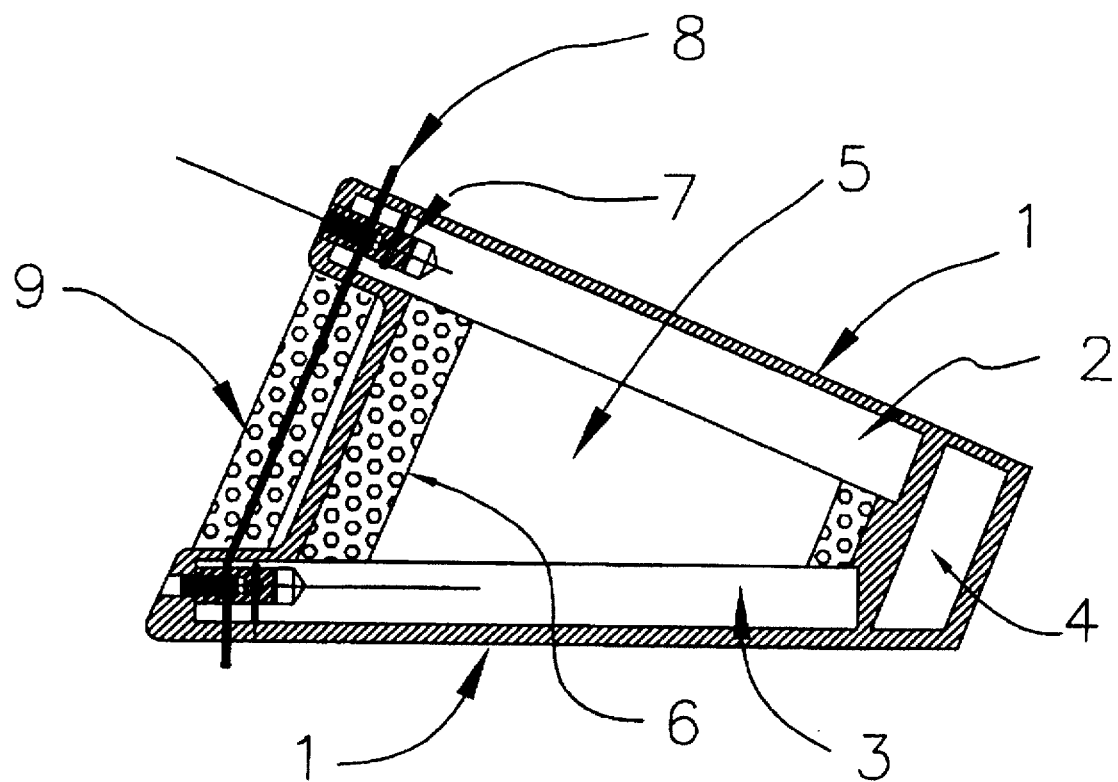
FIG. 2 is a side cut section view of the shoe, view through 2—2 of FIG. 1.
Figure 3:
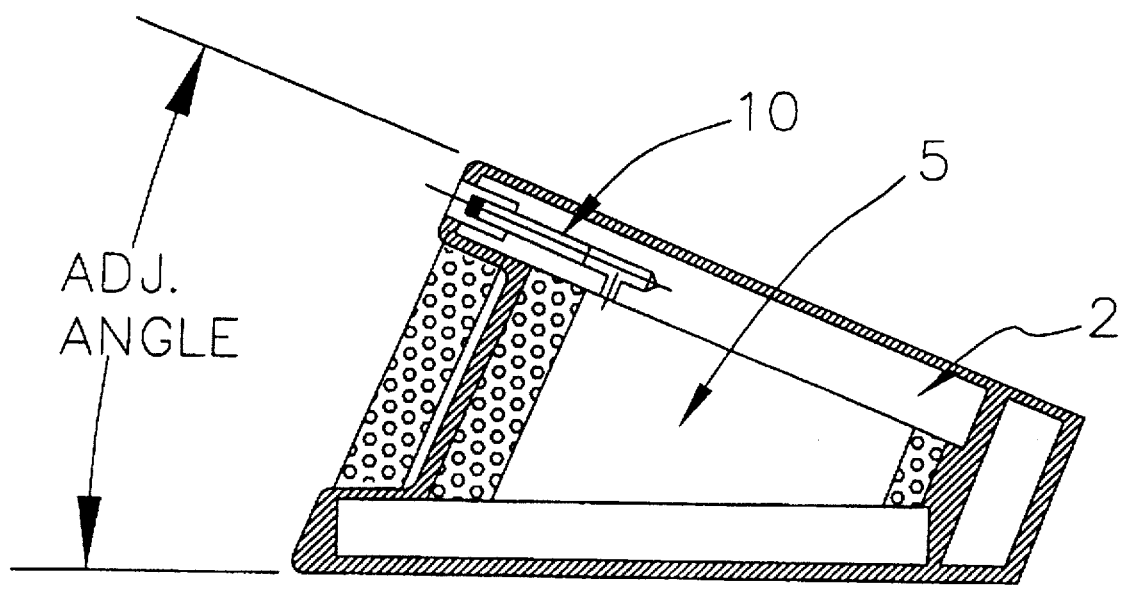
FIG. 3 is a side cut section view of the shoe, view through 1—1 of FIG. 1.
Figure 4:
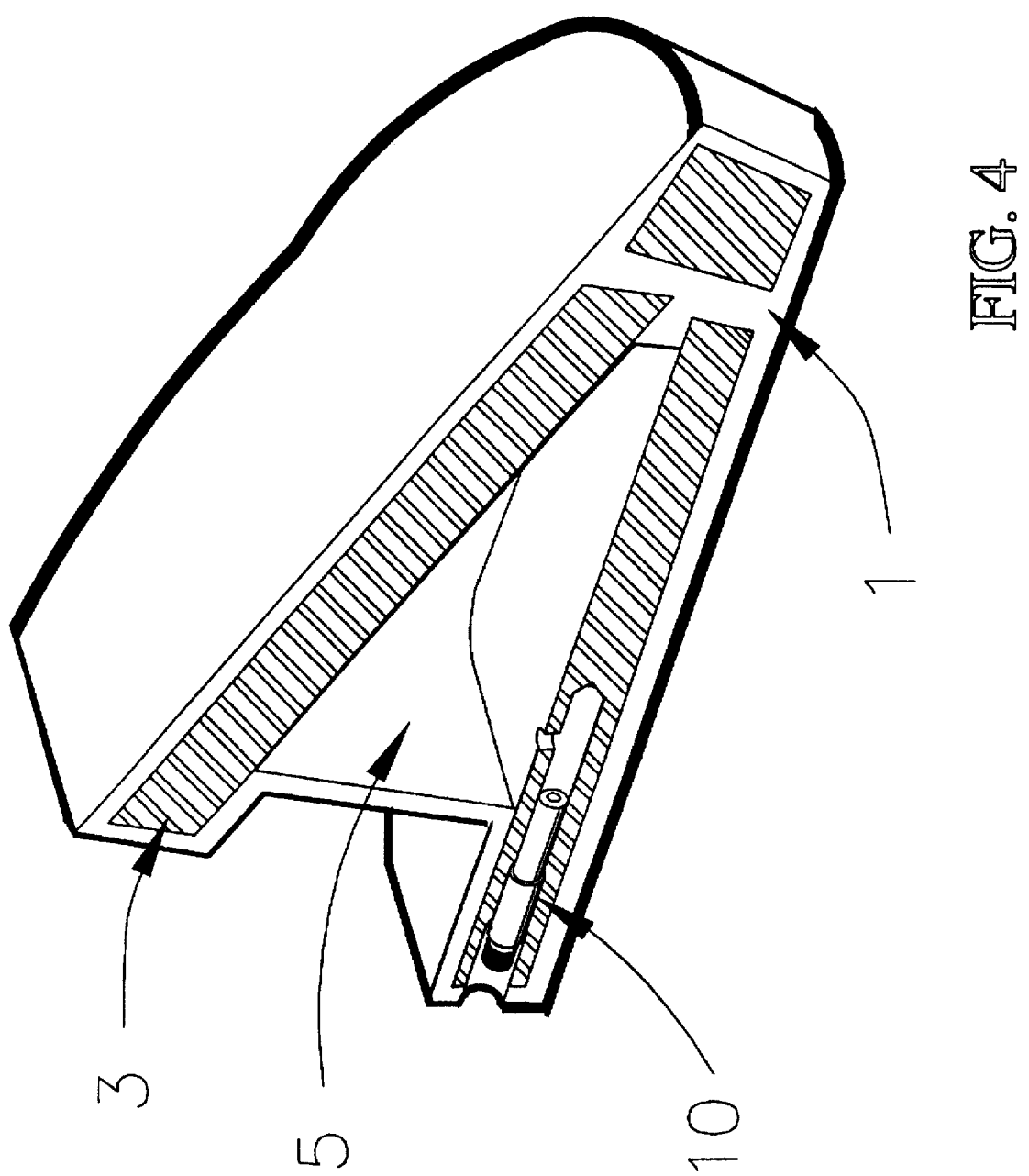
FIG. 4 is a pictorial of a section cut similar to FIG. 3.

Referring to the drawings the elevated horseshoe would generally be shaped, as viewed from the top, as a solid horseshoe FIG. 1. As viewed from the side it would be wedge shaped with the heel higher than the toe, FIGS. 2 and 3.

The outer layer or skin 1 would consist of a resilient material such as urethane. The skin 1 would encapsulate the internal components 2,3,4,6 and penetrate between 4 and the two surfaces of 2 and 3 causing a chamber 5 to be sealed within the open cell foam 6.

Figure 6:
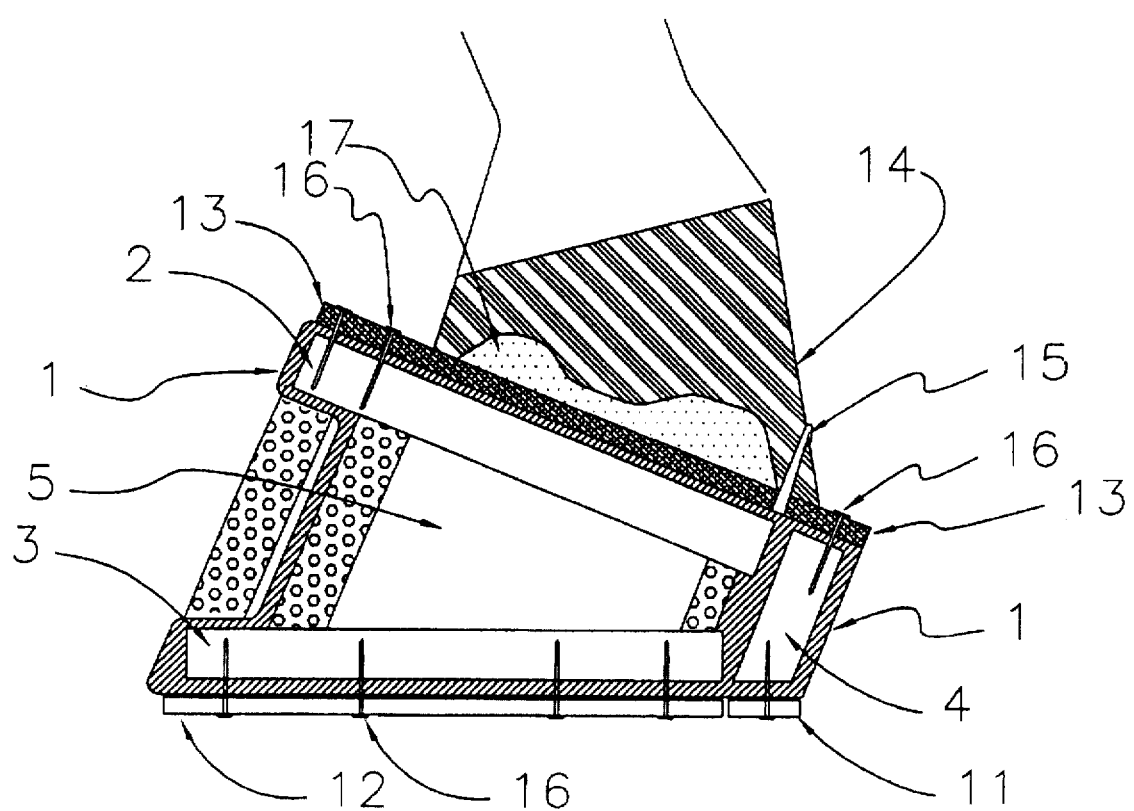
FIG. 6 is a side cut view similar to FIG. 3 showing the shoe attached to the horse.

The rigid members 2,3,4 usually would be made of wood and make up a nonflexible top and bottom surface on the shoe and allow the shoe to be fastened to the nailer pad 13 with nails 16 on FIG. 6 and allow wear plates 11,12 to be fastened with nails 16 as desired.

The rigid members 2,3 are of different lengths to allow the user the choice of placement of the elevated shoe with the horse's hoof 14, the long or short side could be considered the top or bottom by choice.

The rigid members 2,3 during assembly would be separated by a wedge shaped donut 6 of open cell foam. The open cell foam 6 typically would be glued to 2,3 developing a chamber 5 with 2,3 being the top and bottom extremes and 6 being the inside walls of the chamber 5. The foam 6 besides being the perimeter of the chamber 5 would also serve as a cushion and limit the minimum height of the heel. The foam 6 would also give lateral stability to the shoe.

The members 2 and 3 may have holes drilled into them and wire retainers 7 inserted in place to allow the use of a restraining cable 8 to be used to limit or adjust the heel height of the shoe at both corners. A piece of open cell foam 9 may be fitted at the heel of the shoe for mainly cosmetic purposes.

The members 2 or 3 could have holes drilled at both parallel and right angles causing a port to the chamber 5 This port could then be fitted with a valve 10, similar to a auto tire valve, to be sealed therein allowing a means to pressure compensate the chamber 5.

Figure 5:
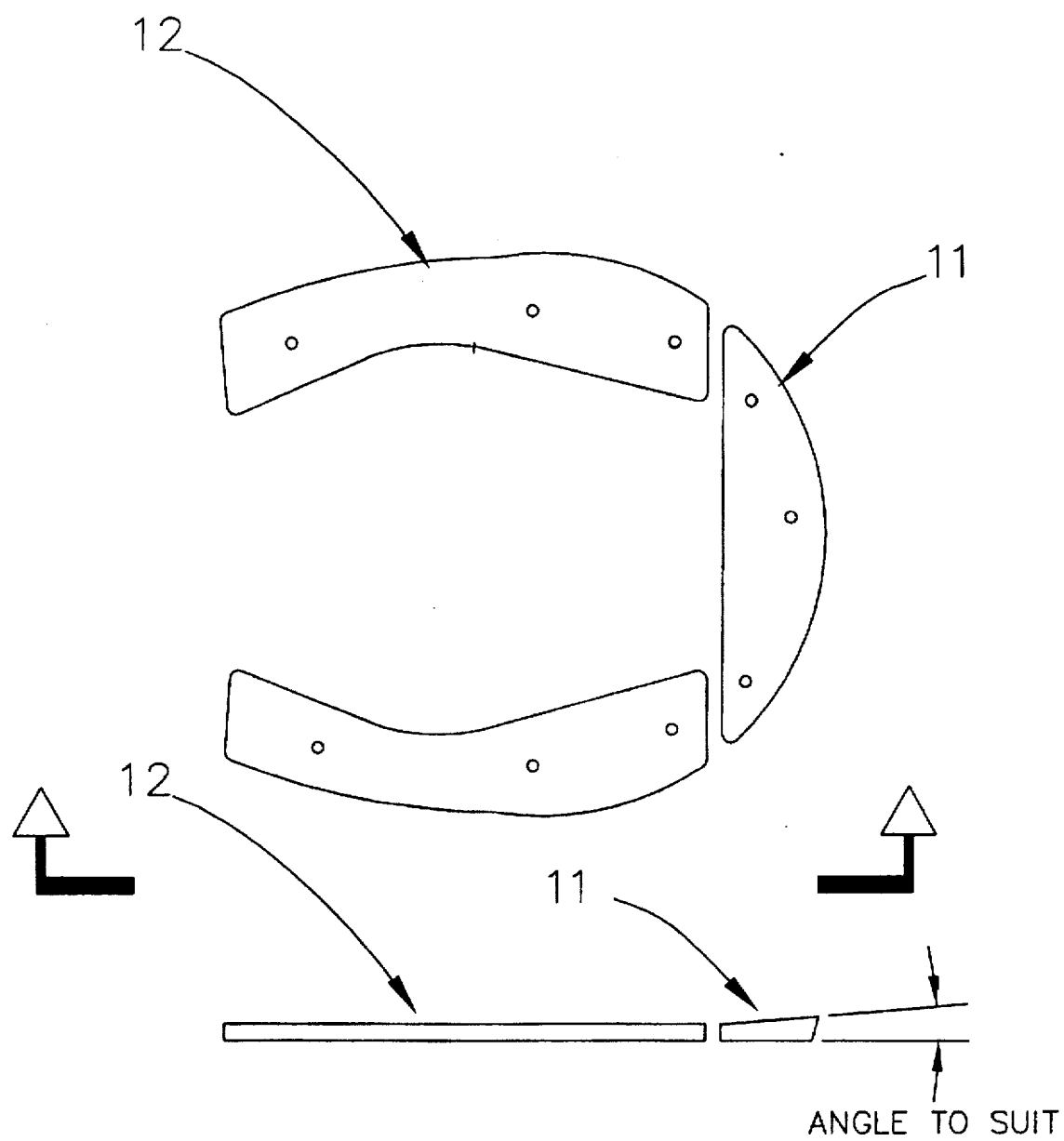
FIG. 5 is a plan and side view of the optional wear plates.

As the shoe is installed on a horse and a heel height is set the shoe may flex causing the bottom surface to bend, the top being restrained by being attached to the flat nailer plate 13. The bend on the bottom depends on the placement of the pivot point within the toe of the shoe 1 and the set angle To compensate for the condition a wear plate of at least two pieces FIG. 5 may be used to flatten the bottom of the shoe to suit.

The shoe generally would be made by fabricating the components 2,3,4,6,7, gluing 6 to 2,3, inserting retainers 7 and valve 10 into 2,3, position the assembly of 2,3,4,6,7,10 into a desired form or mold and pour with urethane 1. After allowing time to cure the elevated shoe assembly would be ready for use.

The outer surface of 1 is approximately 1/8" thick except at the toe area where it could be solid if 4 was eliminated. The sides and heel of 1 around the chamber 5 could vary and would be of equal thickness or thinner walled at the heel than towards the toe, typically it would vary from 3/16- to 1/8". This is because as the heel is raised it pivots near the toe causing more stretch at the heel than near the toe. In order for the tension of 1 to be equal the thickness could vary as described. The actual shape and thickness of 1 would usually be determined by the needs to simplify the form and the shock and rebound characteristics desired.

Once constructed the elevated shoe would be installed as follows:

The horse hoof 14 would be trimmed and prepared for shoeing. An elevated shoe size would be established. A 1/2" nailer pad 13 would be shaped to conform with the chosen elevated shoe FIG. 1. The nailer pad 13 would then be nailed 15 to the horses hoof 14 with silicone or other packing 17 between the hoof 14 and the nailer pad 13.

The elevated shoe 1,2,3,4,5,6,7,8,9,10 as an assembly would then be aligned with the nailer pad 13 and the nailer pad 13 would be nailed 16 to the elevated shoe surface material 1 and into 2 or 3.

The shoe could now be pressurized using valve 10 and the heel height set by adjusting 7,8. In order to better secure the shoe on the horse a conventional rim band (not illustrated) may be used.

While the preferred embodiment of the invention has been described here-in, variations in design may be made. The scope of the invention, therefore, is only to be limited by the claims appended hereto.

The embodiments of the invention which an exclusive property is claimed is as follows:

1. An elevated horseshoe for the front feet of gaited performance horses such as the Tennessee Walking horse wherein the heel height and rebound characteristics are adjustable comprising:

a) an elevated horseshoe with a shape similar to, yet larger around than, a horse's hoof and having a heel height higher than the toe height, molded or formed in one piece and having resilient skin and body material, with at least one chamber within said horseshoe body in the rear 2/3 portion of said horseshoe;

b) the top and bottom surfaces of said horseshoe being structurally capable of being nailed or otherwise attached to a nailer plate or horse's hoof, the bottom surface having a flexible portion near the toe of said horseshoe which will bend when required during heel compression of said horseshoe body;

c) the sidewall and heel portion of said horseshoe body being extensible and compressible, such that when the body of said horseshoe is compressed the top surface of said horseshoe can become parallel with the bottom surface, and such that when the heel portion of said horseshoe body is fully extended the top surface of said horseshoe makes an included angle of substantially 20 degrees with the bottom surface of said horseshoe;

d) the said at least one chamber in said horseshoe being sealed from atmospheric pressure, and having means to pressure compensate the said at least one chamber for the desired heel height and or rebound characteristics of the said horseshoe;

e) the heel portion of said horseshoe having means to limit, restrain and adjust the desired heel height, on both rear corners of said horseshoe.

2. An elevated horseshoe for the front feet of gaited performance horses such as the Tennessee Walking horse wherein the heel height is predetermined and the rebound characteristics are adjustable comprising:

a) an elevated horseshoe with a shape similar to, yet larger around than, a horse's hoof, having a heel height higher than the toe height, molded or formed in one piece and having resilient skin and body material, having at least one chamber within said horseshoe body in the rear 2/3 portion of said horseshoe;

b) the top and bottom surfaces of said horseshoe being structurally capable of being nailed or otherwise attached to a nailer plate or the horse's hoof, the bottom surface of said horseshoe having a flexible portion near the toe which will bend when required during heel compression of said horseshoe body;

c) the sidewall and heel portion of said horseshoe body being extensible and compressible, such that when the body of said horseshoe is compressed the top surface of said horseshoe can become parallel with the bottom surface of said horseshoe, and such that when the heel portion of said horseshoe is fully extended the top surface of said horseshoe may make a predetermined angle of substantially 20 degrees with the bottom surface of said horseshoe;

d) said at least one chamber in said horseshoe being sealed from atmospheric pressure, and having means to pressure compensate said at least one chamber within said horseshoe to control the rebound characteristics of said horseshoe.

* * * * *